(12) United States Patent
Branham et al.

(10) Patent No.: US 7,232,234 B2
(45) Date of Patent: Jun. 19, 2007

(54) VIBRATION RESISTANT VEHICLE MIRROR CONNECTING ASSEMBLY

(75) Inventors: Michael Dean Branham, Blythewood, SC (US); Emmanuel Courbon, Columbia, SC (US)

(73) Assignee: Lang-Mekra North America, LLC, Ridgeway, SC (US)

( * ) Notice: Subject to any disclaimer, the term of this patent is extended or adjusted under 35 U.S.C. 154(b) by 66 days.

(21) Appl. No.: 11/073,947

(22) Filed: Mar. 7, 2005

(65) Prior Publication Data

US 2006/0198040 A1    Sep. 7, 2006

(51) Int. Cl.
*B60R 1/06* (2006.01)
*F16B 7/04* (2006.01)
(52) U.S. Cl. .............. 359/871; 403/297; 248/475.1
(58) Field of Classification Search ........... 359/841, 359/871, 872, 881; 248/475.1, 480, 230.2, 248/229.11, 231.31, 638; 403/297
See application file for complete search history.

(56) References Cited

U.S. PATENT DOCUMENTS

| 734,509 A | 7/1903 | Caesar |
| 812,560 A | 2/1906 | Lovegrove |
| 2,526,306 A * | 10/1950 | Van Gelder .......... 248/279.1 |
| 3,168,277 A * | 2/1965 | Stewart ............ 248/479 |
| 4,344,719 A | 8/1982 | Thom |
| 4,565,345 A | 1/1986 | Templeman |
| 4,625,939 A | 12/1986 | Bergelt |
| 5,419,522 A | 5/1995 | Luecke et al. |
| 5,513,048 A * | 4/1996 | Chen .................. 359/881 |
| 6,352,231 B1 * | 3/2002 | Lang et al. ........... 248/475.1 |
| 6,454,483 B1 | 9/2002 | Hoshino |
| 2005/0008431 A1 | 1/2005 | Albaugh |

FOREIGN PATENT DOCUMENTS

| DE | 29 50 742 A1 | 6/1981 |
| EP | 1 086 855 A2 | 3/2001 |
| EP | 06 00 4636 | 6/2006 |

* cited by examiner

*Primary Examiner*—Leonidas Boutsikaris
*Assistant Examiner*—Mark Consilvio
(74) *Attorney, Agent, or Firm*—McNair Law Firm, P.A.

(57) ABSTRACT

A connection sleeve having an open hollow end portion and being carried by one of the mirror support arm and the vehicle mount. A connector shaft carried by one of the mirror support arm and the vehicle mount for being received within the connection sleeve. A longitudinal wedge pocket formed in the connector shaft having a slanted pocket contact surface. A camming wedge disposed within the wedge pocket having a slanted bearing surface adapted to bear against the slanted pocket contact surface and the connection sleeve. An operator for moving the camming wedge into the wedge pocket against the slanted pocket contact surface whereby the wedge and connector shaft are simultaneously forced against the connection sleeve to provide a tight vibration resistant connection between a mirror support arm and a vehicle mount.

18 Claims, 6 Drawing Sheets

VIBRATION RESISTANT VEHICLE MIRROR CONNECTING ASSEMBLY

BACKGROUND OF THE INVENTION

1) Field of the Invention

The present invention relates to vehicle mirror assemblies, and more particularly, to a vibration resistant connector for attaching a mirror support arm to a vehicle mount attached to the vehicle body.

2) Description of Related Art

A problem with large exterior side view vehicle mirror assemblies carried by commercial tractor-trailers and other large vehicles is that the vehicles produce constant vibration, which caused the connection of the mirror assembly to the vehicle to loosen over time. Typically, the vehicle mirror assembly includes large tubular frame member which carries the mirror assembly. The tube frame is then affixed to a vehicle mounted attachment by way of a tube connector. The connection between the tube connector and the tubular frame is where vibrations cause the components to loosen.

Typically, the connection between the tube frame and the tube connector is accomplished by one of several ways. One way of connecting these components is by a press fit which essentially squashes the tube frame to the tube connector. The press fit has resulted in numerous problems, however, such as the cracking and breaking of parts under pressure and generally loose connections. When the press fit does not provide a tight connection, screws are used to attempt to resolve the problem, but it has been found that over time the screws can loosen up through vibration and cause the parts to wear on each other and eventually fail.

Another way of attaching the tube frame to the tube connector involves the use of glues. Gluing the parts together presents many manufacturing problems as the components must sit a certain amount of time to cure. Additionally, gluing is more expensive and has not produced a dependable vibration resistant connection.

Yet another way to attach the tube frame to the tube connector is to cut notches into the tube connector and then press the tube frame into the notches. This has had some success when using carbon steel tubing with minimal rebound memory. Stainless steel tubing, however, springs back to far to provide a reliable tight connection. Pressing the steel tubing far enough to compensate for this spring back typically breaks the tube-connector, which is usually made of aluminum.

Alternatively, some skilled in the art have attempted to get rid of the tube connector entirely by flattening the end of the tube frame and bolting it directly to the vehicle mounted attachment. However, this does not provide a good joint between the components and loosens up over time due to vibration.

U.S. Pat. No. 4,565,345 discloses a mirror assembly that includes an expandable ball and socket arrangement for selectively retaining a mirror in a desired rotational position relative to the vehicle. The expandable ball comprises a plurality of partially spherical segments which expand outward from an axial bore when a draw bolt is received through the ball. The spherical segments then bias against the socket to hold the mirror in position. This invention is not directed to providing a sturdy connection for large tubular frame members carrying mirror assemblies of the type found on commercial tractor-trailers. Rather this connector was designed simply to hold a small mirror of the type found on passenger vehicles in a fixed position, and is not intended to serve as a structural support for carrying and attaching large mirror assemblies to a vehicle.

U.S. Pat. No. 5,419,522 discloses an adjustable mount having a pair of ball and socket units in which a screw engages a wedge, which in turn forces a pair of plungers to engage ball elements that hold the adjustable mount in a desired position. As the screw is tightened, the wedge is drawn upward which forces the plungers laterally to engage the ball elements. This connector assembly is intended to allow the mirror to be easily repositioned by loosening and tightening of the screw and there is no suggestion that this connector could be useful in securing large mirror assemblies to vehicles.

Accordingly, it is an object of the present invention to provide a vibration resistant connector assembly for affixing a mirror support arm carrying a mirror assembly to a vehicle mount so that vibration caused by driving of the vehicle do not cause the connection to become loose.

SUMMARY OF THE INVENTION

In summary, the invention includes a mirror support arm for carrying at least one mirror, and a vibration resistant connector for connecting the mirror support arm to a vehicle mount. The vibration resistant connector includes a connection sleeve formed by an open hollow end portion of the mirror support arm. A connector shaft is carried by the vehicle mount for being received within the connection sleeve. A longitudinal wedge pocket is formed in the connector shaft having a pocket contact surface. A camming wedge is disposed within the wedge pocket adapted to bear against the pocket contact surface and the connection sleeve. An operator is provided for tightening the camming wedge against the pocket contact surface to cause the wedge to slide along the pocket contact surface and simultaneously force the wedge and connector shaft against the connection sleeve, whereby a tight vibration resistant connection is provided between the mirror support arm and the vehicle mount.

In an embodiment of the invention, the pocket contact surface includes a slanted contact face for engaging the camming wedge so that actuation of the operator causes the camming wedge and connector shaft to be forced laterally within the connection sleeve as the camming wedge slides along the slanted contact face.

In a further embodiment of the invention, the pocket contact surface includes a first slanted contact face forming an upper portion of the wedge pocket, and a second slanted contact face horizontally offset from the first slanted contact face which forms a lower portion of the wedge pocket, and the camming wedge being adapted to be received into the upper and lower portion of the wedge pocket to provide a generally cylindrical cross-section together with the connector shaft.

In a further embodiment of the invention, the wedge includes a bearing portion for extending into the upper portion of the wedge pocket, and an operator receiving portion for extending into the lower portion of the wedge pocket.

In a further embodiment of the invention, the bearing portion includes an upper inner bearing surface for engaging the first slanted contact face, and a convex outer bearing surface opposite the upper inner bearing surface for engaging the connection sleeve.

In a further embodiment of the invention, the operator receiving portion includes a lower inner bearing surface horizontally offset from the upper inner bearing surface for engaging the second slanted contact face, and the convex outer bearing surface extending along the operator receiving portion opposite the lower inner bearing surface for engaging the connection sleeve.

In a further embodiment of the invention, the connector shaft includes an opening for receiving the operator and allowing the operator to pass through the connector shaft to engage and actuate the wedge.

In a further embodiment of the invention, the operator and opening in the connector shaft are adapted to provide play between the operator and the connector shaft to allow the connector shaft to shift laterally within the connection sleeve when the camming wedge is drawn against the pocket contact surface.

In a further embodiment of the invention, the camming wedge includes a threaded receiving slot for receiving the operator, and the operator includes complementary threading for engaging the threaded receiving slot of the wedge so that rotation of the operator causes the wedge to be drawn into the wedge pocket to engage the pocket contact surface.

In a further embodiment of the invention, the operator includes an actuator head at a distal end of the operator adapted for being actuated to rotate the operated to cause the camming wedge to be drawn into the wedge pocket to engage the pocket contact surface.

In a further embodiment of the invention, the operator passes through the connector shaft to engage the wedge, and the actuator head is positioned in direct contact with an exterior surface of the connection sleeve so that said connection sleeve is directed to bear against said connector shaft by said actuator head.

In a further embodiment of the invention, the operator passes through the connector shaft to engage the wedge, and the actuator head is positioned in direct contact with the connector shaft so that said actuator head is directed to bear against said connector shaft causing said connector shaft to bear against said connection sleeve.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION

Figure 1:
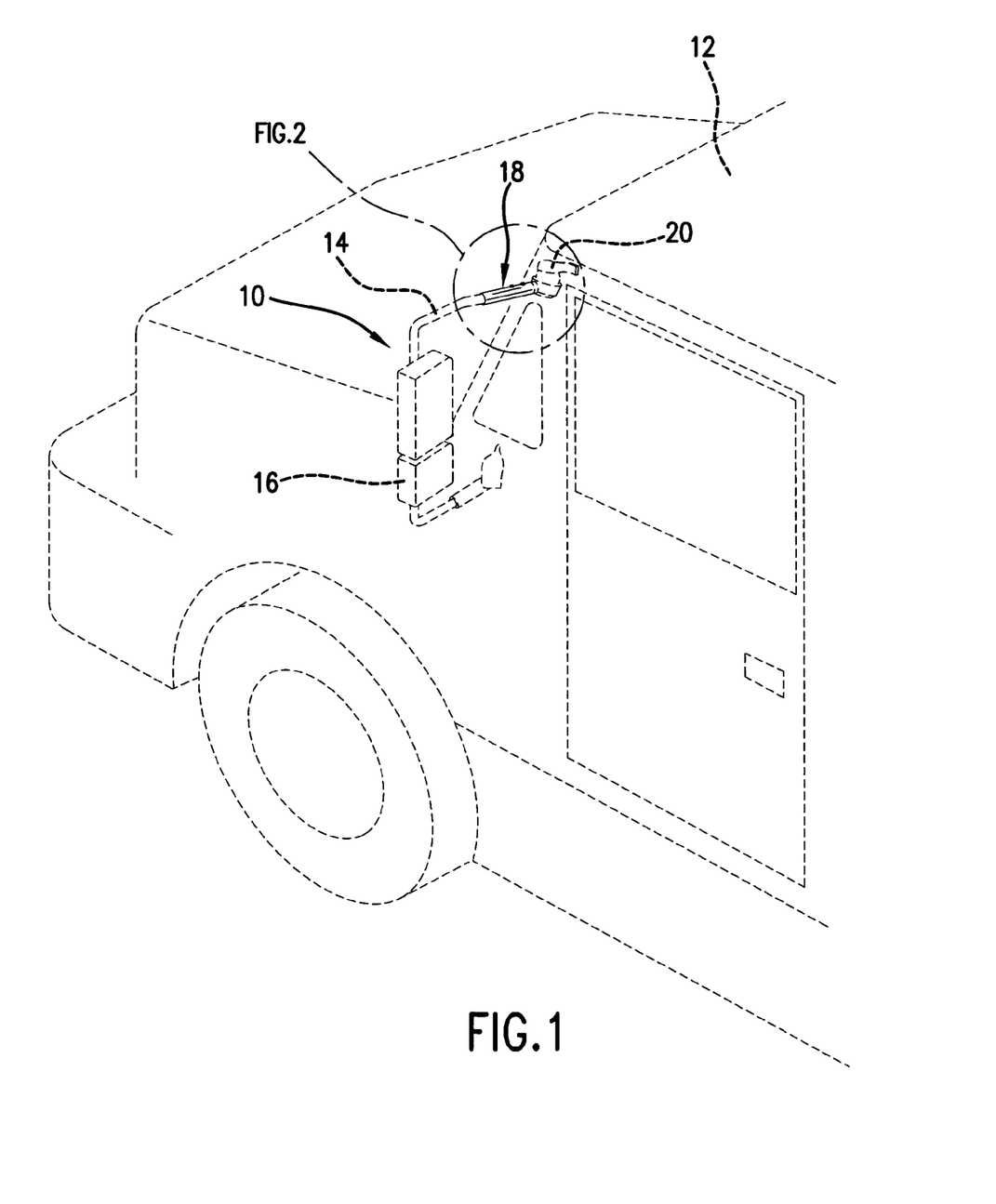
FIG. 1 shows a perspective view of a vehicle mirror assembly having a vibration resistant connector according to the present invention.

With reference to the drawings, the invention will now be described in more detail. Referring to FIG. 1, a vehicle mirror assembly, designated generally as 10, is shown mounted to a vehicle body 12. Mirror assembly 10 includes a mirror support arm 14 for carrying at least one mirror 16. A vibration resistant connector, designated generally as 18, is provided for connecting mirror support arm 14 to a vehicle mount 20, which is affixed to an exterior of vehicle body 12. Vehicle mount 20 may be constructed from various component parts or may be a single part, which however is adapted for connecting with the mirror support arm.

Figure 2:
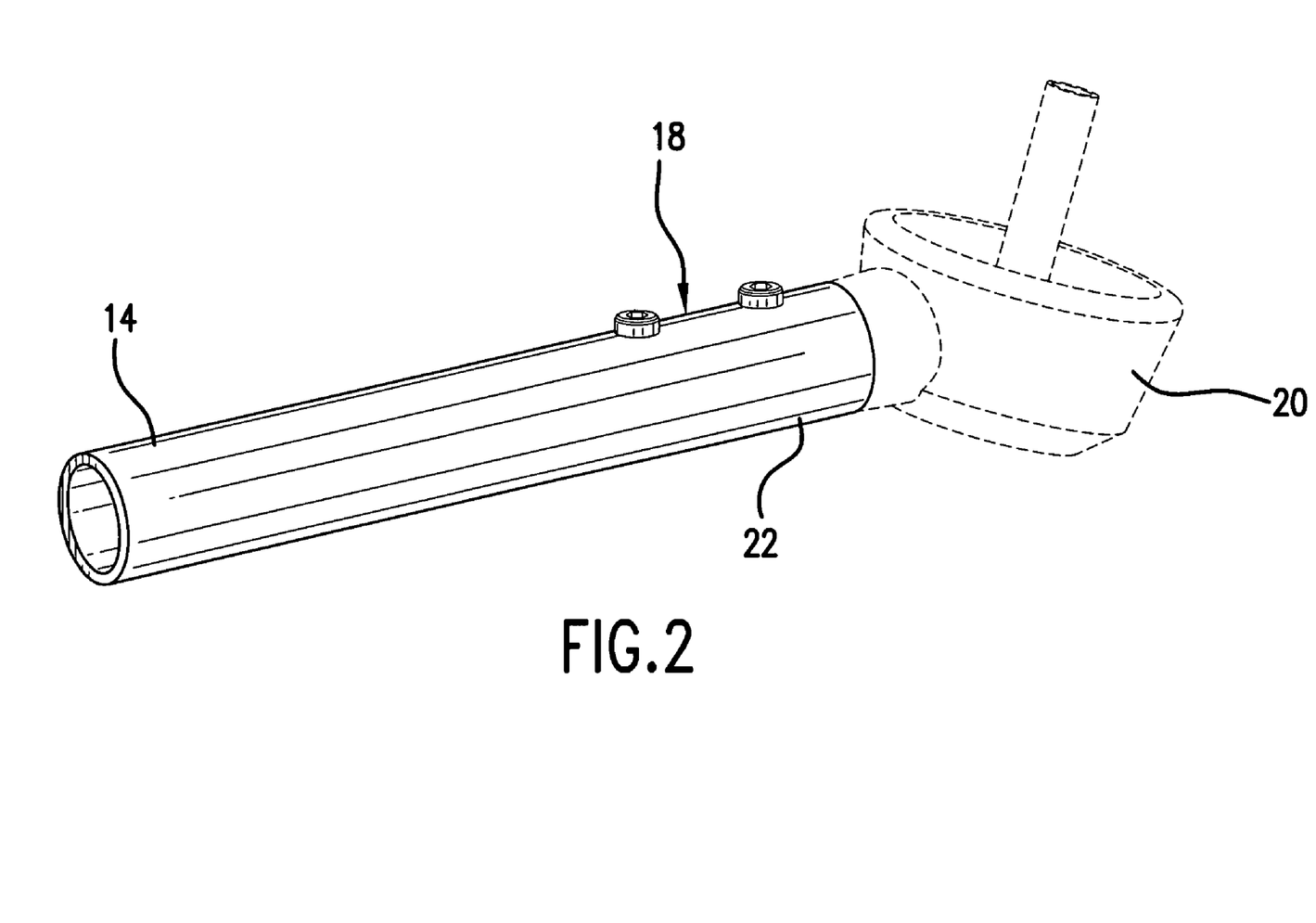
FIG. 2 shows a close-up perspective view of the mirror support arm connected to the vehicle mount according to the invention.
Figure 3:
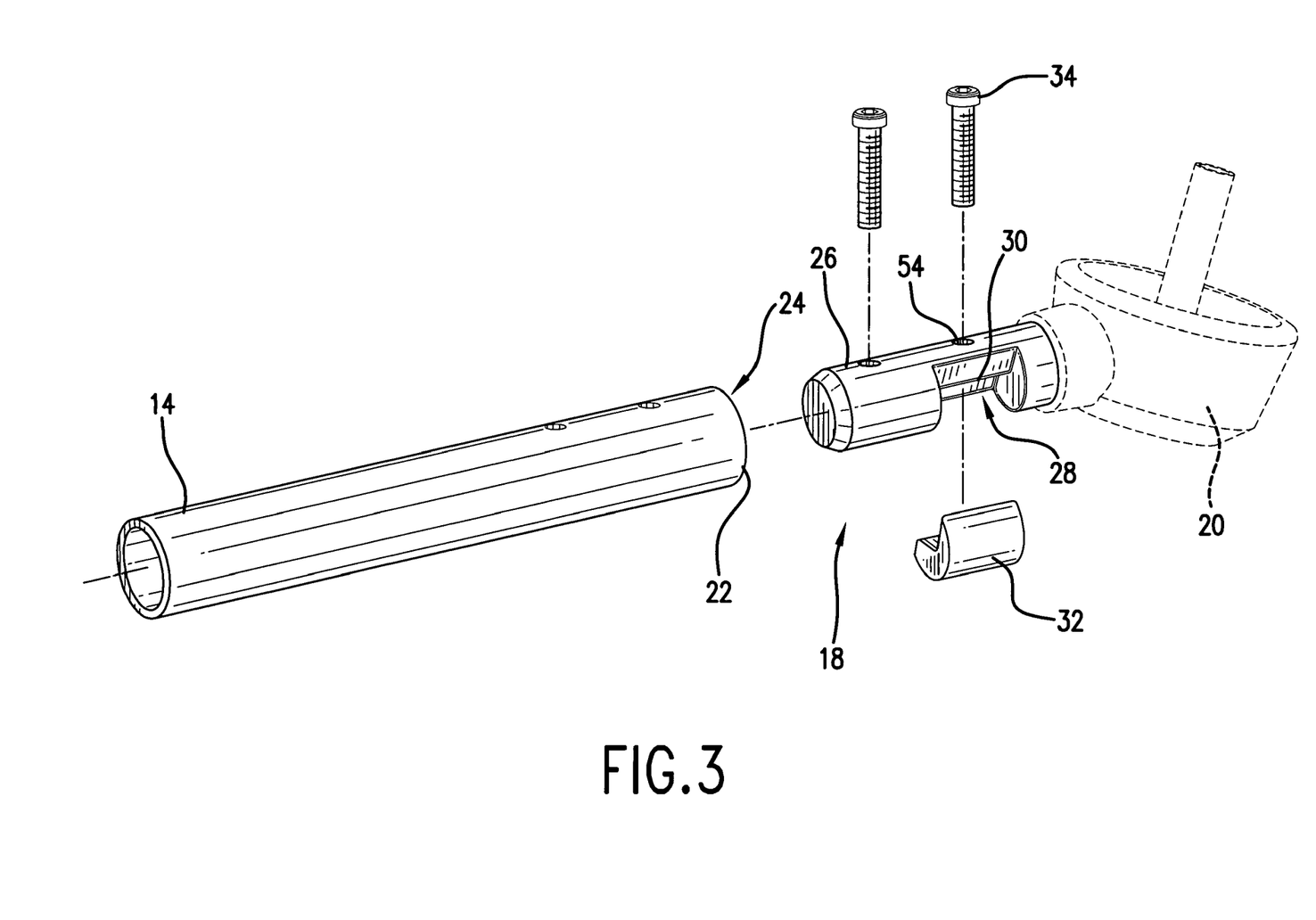
FIG. 3 shows an exploded view of FIG. 2.

Referring to FIGS. 2 and 3, vibration resistant connector 18 includes a connection sleeve 22 formed by an open hollow end portion, designated generally as 24, of mirror support arm 14. A connector shaft 26 is carried by vehicle mount 20 for being received within connection sleeve 22. In an alternative arrangement, connection sleeve 22 may be carried by vehicle mount 20 and connector shaft 26 may be carried by mirror support arm 14. As such, the invention is not limited strictly to the arrangement illustrated in the figures as those skilled in the art are aware of other alternative arrangements for the connection sleeve and connector shaft.

Referring to FIG. 3, a longitudinal wedge pocket, designated generally as 28, is formed in connector shaft 26. Wedge pocket 28 is defined as having a pocket contact surface 30. A camming wedge 32 is disposed within wedge pocket 28 and is adapted to bear against pocket contact surface 30. As described herein below, camming wedge 32 is also directed to bear against connection sleeve 22 as a result of the wedge's interaction with pocket contact surface 30.

An operator 34 is provided for tightening camming wedge 32 against pocket contact surface 30. As discussed in further detail below, operator 34 causes wedge 32 to slide along and bear against pocket contact surface 30 so that wedge 30 is directed to bear against connection sleeve 22, while simultaneously urging connector shaft 26 against connection sleeve 22. As a result, a tight vibration resistant connection is provided between mirror support arm 14 and vehicle mount 20.

As illustrated in the figures, pocket contact surface 30 is slanted and camming wedge 32 is adapted with a reciprocal slanted surface for engaging the slanted pocket contact surface 30 so that actuation of operator 34 causes camming wedge 32 and connector shaft 26 to be forced laterally within connection sleeve 22 as camming wedge 32 slides along the slanted pocket contact surface.

Figure 4:
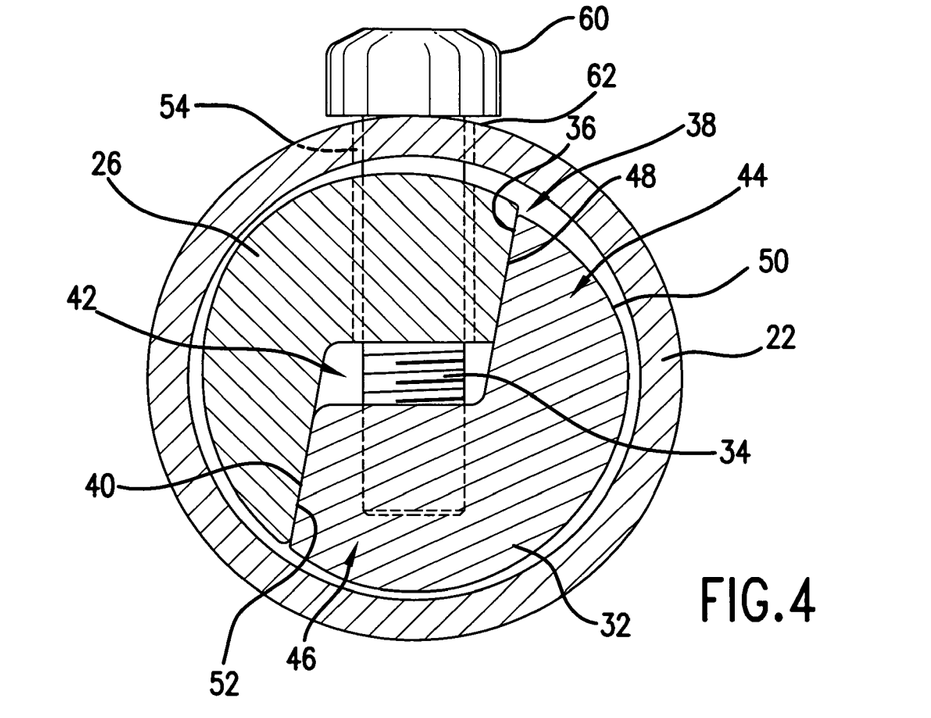
FIG. 4 shows a cross-section view of the vibration resistant connector in an disengaged position according to the present invention.

Referring to FIG. 4, in an further advantageous embodiment of the invention, pocket contact surface 30, as identified in FIG. 3, includes a first slanted contact face 36 forming an upper portion of the wedge pocket, designated generally as 38. Additionally, a second slanted contact face 40 is provided that is horizontally offset from first slanted contact face 36. Second slanted contact face 40 forms a lower portion of the wedge pocket, designated generally as 42. As illustrated, camming wedge 32 is adapted to be received into the upper and lower portion of the wedge pocket 38 and 42, respectively, to provide a generally cylindrical cross-section together with connector shaft 26 that fills open hollow end portion 24 of connection sleeve 22.

Camming wedge 32 is defined to include a bearing portion, designated generally as 44, for extending into upper portion of the wedge pocket 38. Camming wedge 32 is further defined to include an operator receiving portion, designated generally as 46, for extending into the lower portion of the wedge pocket 42. Bearing portion 44 includes an upper inner bearing surface 48 for engaging first slanted contact face 36, and a convex outer bearing surface 50 opposite upper inner bearing surface 48 for engaging connection sleeve 22 when the operator is actuated to tighten the wedge into wedge pocket 28. Further, operator receiving portion 46 includes a lower inner bearing surface 52 horizontally offset from upper inner bearing surface 48 for engaging second slanted contact face 40. Convex outer bearing surface 50 also extending along operator receiving portion 46 opposite lower inner bearing surface 52 for engaging connection sleeve 22 as note above.

Figure 5:
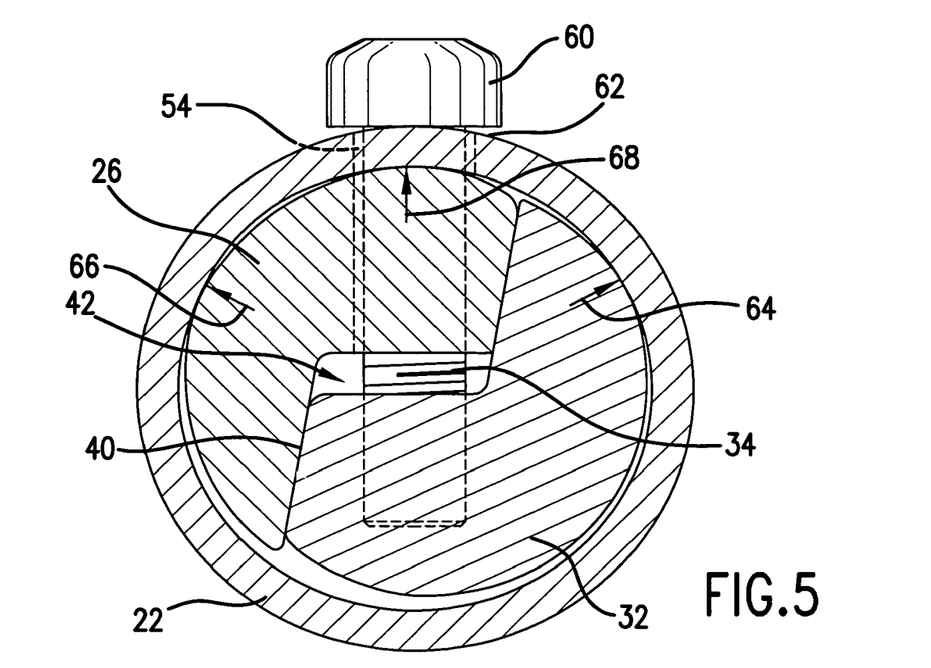
FIG. 5 shows a cross-section view of the vibration resistant connector in an engaged position according to the present invention.

Referring to FIGS. 4 and 5, in a further embodiment of the invention, connector shaft 26 includes an opening 54 for receiving operator 34 and allowing the operator to pass through connector shaft 26 to engage and actuate camming wedge 32. Operator 34 and opening 54 in connector shaft 26 are adapted to provide play between operator 34 and connector shaft 26 to allow connector shaft 26 to be shifted laterally within connection sleeve 22 when camming wedge 32 is drawn against slanted contact faces 36 and 40. As shown in FIG. 4, camming wedge 32 is positioned in a disengaged position before operator 34 has been actuated to tighten the wedge into wedge pocket 28. As shown in FIG. 5, camming wedge 32 has been drawn by operator 34 into an engaged position against slanted contact faces 36 and 40, as detailed above. As slanted contract faces 36 and 40 engage upper inner bearing surface 48 and lower inner bearing surface 52, connector shaft 26 is forced laterally in an opposite direction from camming wedge 32, which, in the illustrated embodiment, causes connection sleeve 22 to slightly deform. However, it is not necessary for connection sleeve 22 to deform to obtain a tight connection. Without the play provided between operator 34 and opening 54 of connector shaft 26, no lateral movement would be provided to deform connection sleeve 22 and securely bear wedge 32 and connector shaft 26 against connection sleeve 22.

Figure 6:
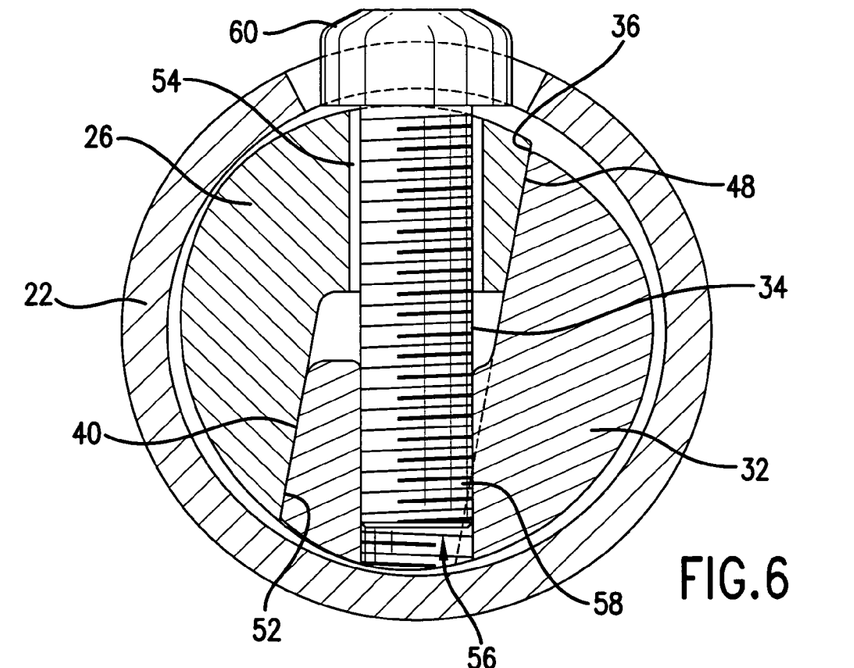
FIG. 6 shows a cross-section view of an alternative embodiment of the vibration resistant connector in a disengaged position according to the present invention.
Figure 7:
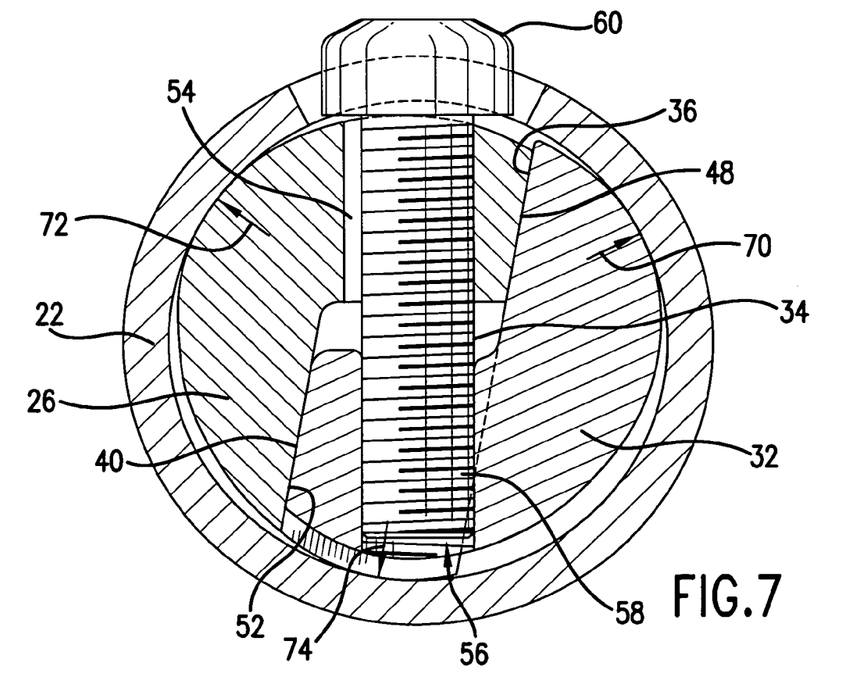
FIG. 7 shows a cross-section view of an alternative embodiment of the vibration resistant connector in an engaged position according to the present invention; and, FIG. 8 shows a cross-section view of an alternative embodiment of the vibration resistant connector in an engaged position beyond the operator according to the present invention.

As best shown in FIGS. 6 and 7, in a further embodiment of the invention, camming wedge 32 includes a threaded receiving slot, designated generally as 56, for receiving operator 34. Operator 34 further includes complementary threading 58 for engaging threaded receiving slot 56 of wedge 32 so that rotation of operator 34 causes wedge 32 to be drawn into wedge pocket 28 to engage slanted contact faces 36 and 40.

Referring to FIGS. 4 and 6, in a further embodiment of the invention, operator 34 includes an actuator head 60 at a distal end of operator 34 adapted for being actuated to rotate operated 34 to cause camming wedge 32 to be drawn into wedge pocket 28 as detailed above. Preferably, actuator head 60 is adapted to engage at least one of the various types of screw drivers and the like for rotating the operator.

As illustrated in a first embodiment represented by FIG. 4 and 5, operator 34 passes through connector shaft 26 to engage wedge 32. Actuator head 60 then positioned in direct contact with an exterior surface 62 of connection sleeve 22. As a result of the slanted pocket contact faces, camming wedge 32 and connector shaft 26 shift laterally during engagement to deform connection sleeve 22 when operator 34 is actuated to tighten camming wedge 32 into wedge pocket 28. As illustrated in the engaged position of FIG. 5, wedge 32 is directed to bear against connection sleeve 22 generally at a 2 o'clock position, indicated by reference arrow 64, connector shaft 26 is simultaneously directed to bear against connection sleeve 22 generally at a 10 o'clock position, indicated by reference arrow 66, and actuator head 30 is directed to bear against exterior surface 62 of connection sleeve 22 causing connection sleeve 22 to bear against connector shaft 26 at generally a 12 o'clock position, indicated by reference arrow 68.

Figure 8:
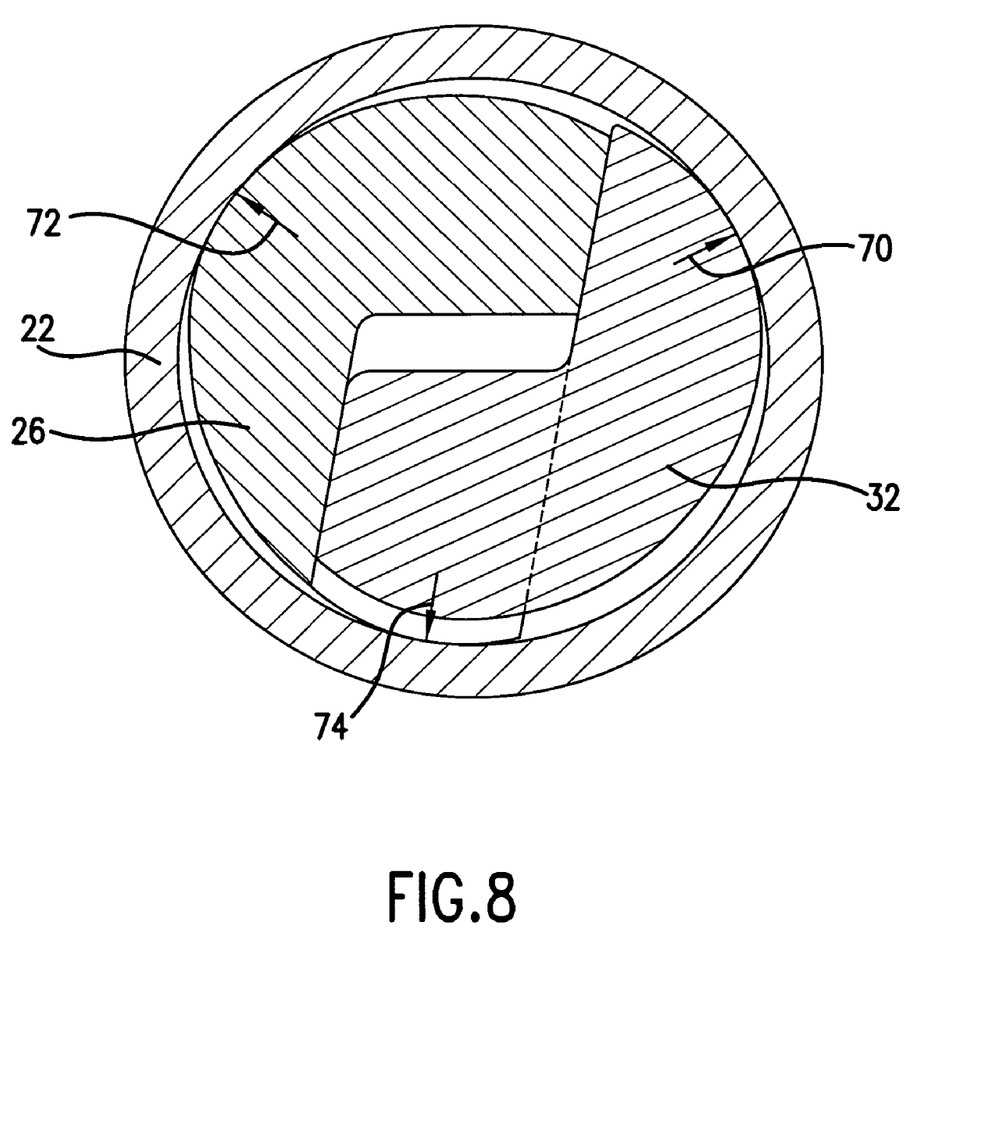

In an alternative embodiment of the invention illustrated in FIGS. 6, 7 and 8, operator 32 passes through connector shaft 26 to engage wedge 32, and actuator head 60 is positioned in direct contact with connector shaft 26, instead of resting on exterior surface 62 of connection sleeve 22 as shown in FIGS. 4 and 5. This alternative embodiment provide a more equal distribution of force within connection sleeve 22 as connector shaft 26 and wedge 32 move laterally. In this case, when operator 32 is actuated to tighten camming wedge 32 into wedge pocket 28, wedge 32 is directed to bear against connection sleeve 22 generally at a 2 o'clock position, indicated by reference arrow 70, connector shaft 26 is simultaneously directed to bear against connection sleeve 22 generally at a 10 o'clock position, indicated by reference arrow 72, and actuator head 60 is directed to bear against connector shaft 26 causing the connector shaft to bear against connection sleeve 22 at generally a 6 o'clock position, indicated by reference arrow 74. FIG. 8 provides a cross-section view of the arrangement represented in FIG. 7, but without operator 34 to provide a clearer view of the interaction between wedge 32 and connector shaft 26 as described above, which deform connection sleeve 22 to provide a tight vibration resistant connection between mirror support arm 14 and vehicle mount 20. Those skilled in the art will recognize that by slightly altering the shape of connection sleeve 22, wedge 32, and connector shaft 26, the forces described above can be exerted at different points along the interior of connection sleeve 22 from those illustrated, and that the figures are only one example of an operative embodiment.

While a preferred embodiment of the invention has been described using specific terms, such description is for illustrative purposes only, and it is to be understood that changes and variations may be made without departing from the spirit or scope of the following claims.

What is claimed is:

1. A vehicle mirror assembly for attachment to at least one vehicle mount secured to the vehicle, said assembly comprising:
   (a) a mirror support arm for carrying at least one mirror; and,
   (b) a vibration resistant connector for connecting said mirror support arm to said vehicle mount, said vibration resistant connector including:
      (i) a connection sleeve formed by an open hollow end portion of said mirror support arm;
      (ii) a connector shaft carried by said vehicle mount for being received within said connection sleeve;
      (iii) a longitudinal wedge pocket formed in said connector shaft having a pocket contact surface that includes a first slanted contact face forming an upper portion of said wedge pocket, and a second slanted contact face disposed below and horizontally offset from said first slanted contact face forming a lower portion of said wedge pocket; wherein said second slanted contact face is recessed in said wedge pocket from said first slanted contact face to provide a stepped arrangement between said first and second slanted contact faces and said upper and lower portions of said wedge pocket, and wherein said first and second slanted contact faces extend along parallel planes;

(iv) a camming wedge disposed within said wedge pocket adapted to bear against said pocket contact surface and said connection sleeve;

(v) an operator for tightening said camming wedge against said pocket contact surface to cause said wedge to slide along said pocket contact surface and simultaneously force said wedge and said connector shaft to bear against said connection sleeve; wherein said connector shaft includes an opening for receiving said operator and allowing said operator to pass through said connector shaft to engage and actuate said wedge;

whereby a tight vibration resistant connection is provided between said mirror support arm and said vehicle mount.

2. The assembly of claim 1 wherein said wedge includes a bearing portion for extending into said upper portion of said wedge pocket, and an operator receiving portion for extending into said lower portion of said wedge pocket.

3. The assembly of claim 2 wherein said bearing portion includes an upper inner bearing surface for engaging said first slanted contact face, and a convex outer bearing surface opposite said upper inner bearing surface for engaging said connection sleeve.

4. The assembly of claim 3 wherein said operator receiving portion includes a lower inner bearing surface horizontally offset from said upper inner bearing surface for engaging said second slanted contact face, and said convex outer bearing surface extending along said operator receiving portion opposite said lower inner bearing surface for engaging said connection sleeve.

5. The assembly of claim 1 wherein said operator and opening in said connector shaft are adapted to provide play between said operator and said connector shaft to allow said connector shaft to shift laterally within said connection sleeve when said camming wedge is drawn against said pocket contact surface.

6. The assembly of claim 1 wherein said camming wedge includes a threaded receiving slot for receiving said operator, and said operator includes complementary threading for engaging said threaded receiving slot of said wedge so that rotation of said operator causes said wedge to be drawn into said wedge pocket to engage said pocket contact surface.

7. The assembly of claim 1 wherein said operator includes an actuator head at a distal end of said operator adapted for being actuated to rotate said operated to cause said camming wedge to be drawn into said wedge pocket to engage said pocket contact surface.

8. The assembly of claim 7 wherein said operator passes through said connector shaft to engage said wedge, and said actuator head is positioned in direct contact with an exterior surface of said connection sleeve so that said connection sleeve is directed to bear against said connector shaft by said actuator head.

9. The assembly of claim 7 wherein said operator passes through said connector shaft to engage said wedge, and said actuator head is positioned in direct contact with said connector shaft so that said actuator head is directed to bear against said connector shaft causing said connector shaft to bear against said connection sleeve.

10. A vibration resistant connector for connecting a mirror support arm of a vehicle mirror to a vehicle mount secured to a vehicle; said vibration resistant connector comprising:

a connection sleeve having an open hollow end portion and being carried by one of said mirror support arm and said vehicle mount;

a connector shaft carried by the other of said mirror support arm and said vehicle mount for being received within said connection sleeve;

a longitudinal wedge pocket formed in said connector shaft having a slanted pocket contact surface that includes a first slanted contact face forming an upper portion of said wedge pocket, and a second slanted contact face disposed below and horizontally offset from said first slanted contact face forming a lower portion of said wedge pocket; wherein said second slanted contact face is recessed in said wedge pocket from said first slanted contact face to provide a stepped arrangement between said first and second slanted contact faces and said upper and lower portions of said wedge pocket, and wherein said first and second slanted contact faces extend along parallel planes;

a camming wedge disposed within said wedge pocket having a slanted bearing surface adapted to slide along and bear against said slanted pocket contact surface; and, an operator being operatively connected with said wedge for moving said camming wedge against said slanted pocket contact surface; wherein said operator passes through an opening in said connector shaft adapted to provide play between said operator and said connector shaft to allow said connector shaft to shift laterally within said connection sleeve when said camming wedge is drawn against said slanted pocket contact surface;

whereby said wedge slides along said slanted pocket contact surface to simultaneously force said wedge and said connector shaft against said connection sleeve and provide a tight vibration resistant connection between said mirror support arm and said vehicle mount.

11. The assembly of claim 10 wherein said camming wedge includes an upper inner bearing surface for engaging said first slanted contact face, a tower inner bearing surface horizontally offset from said upper inner bearing surface for engaging said second slanted contact face, and a convex outer bearing surface opposite said upper and lower inner bearing surfaces for engaging said connection sleeve.

12. The assembly of claim 10 wherein said operator includes an actuator head at a distal end of said operator adapted for being actuated to rotate said operated to cause said camming wedge to be drawn into said wedge pocket to engage said slanted pocket contact surface.

13. The assembly of claim 12 wherein said operator passes through said connector shaft to engage said wedge, and said actuator head is positioned in direct contact with an exterior surface of said connection sleeve so that said connection sleeve is directed to bear against said connector shaft by said actuator head.

14. The assembly of claim 12 wherein said operator passes through said connector shaft to engage said wedge, and said actuator head is positioned in direct contact with said connector shaft so that said actuator head is directed to bear against said connector shaft causing said connector shaft to bear against said connection sleeve.

15. A method for mounting a vehicle mirror assembly to a vehicle mount secured to a vehicle comprising the steps of:

providing a mirror support arm carrying at least one mirror, said arm having an open hollow end portion forming a connection sleeve;

providing a connector shaft carried by said vehicle mount for being received within said connection sleeve;

providing a longitudinal wedge pocket formed in said connector shaft having a slanted pocket contact surface that includes a first slanted contact face forming an upper portion of said wedge pocket, and a second slanted contact face disposed below and horizontally offset from said first slanted contact face forming a lower portion of said wedge pocket; wherein said second slanted contact face is recessed in said wedge pocket from said first slanted contact face to provide a stepped arrangement between said first and second slanted contact faces and said upper and lower portions of said wedge pocket, and wherein said first and second slanted contact faces extend along parallel planes;

inserting a camming wedge into said wedge pocket having a slanted bearing surface adapted to bear against said slanted pocket contact surface;

inserting said connector shaft into said connection sleeve so that said wedge is received within said connection sleeve;

providing en operator being operatively connected with said wedge for drawing said camming wedge into said wedge pocket against said slanted pocket contact surface;

passing said operator through an opening in said connector shaft adapted to provide play between said operator and said connector shaft to allow said connector shaft to shift laterally within said connection sleeve when said camming wedge is drawn against said slanted pocket contact surface;

actuating said operator to tighten said slanted bearing surface of said wedge against said slanted pocket contact surface so that said wedge slides along said slanted pocket contact surface and simultaneously forces said wedge and said connector shaft against said connection sleeve to provide a tight vibration resistant connection between said mirror support arm and said vehicle mount.

16. The method of claim 15 including the step of providing an actuator head at a distal end of said operator adapted for being actuated to rotate said operated to cause said camming wedge to be drawn into said wedge pocket to engage said slanted pocket contact surface.

17. The method of claim 16 including the step of placing said actuator head in direct contact with an exterior surface of said connection sleeve, so that when said operator is actuated to tighten said camming wedge into said wedge pocket, said wedge is shifted laterally to bear against said connection sleeve, said connector shaft is simultaneously shifted laterally to bear against said connection sleeve, and said actuator heed is directed to bear against said exterior surface of said connection sleeve causing said connection sleeve to bear against said connector shaft.

18. The method of claim 16 including the step of placing said actuator head in direct contact with said connector shaft, so that when said operator is actuated to tighten said camming wedge into said wedge pocket, said wedge is shifted laterally to bear against said connection sleeve, said connector shaft is simultaneously shifted laterally to bear against said connection sleeve, and said actuator head is directed to bear against said connector shaft causing said connector shaft to bear against said connection sleeve.

* * * * *